US007237532B2

(12) United States Patent
Gray, Jr.

(10) Patent No.: US 7,237,532 B2
(45) Date of Patent: *Jul. 3, 2007

(54) METHODS OF OPERATION FOR CONTROLLED TEMPERATURE COMBUSTION ENGINES USING GASOLINE-LIKE FUEL, PARTICULARLY MULTICYLINDER HOMOGENOUS CHARGE COMPRESSION IGNITION (HCCI) ENGINES

(75) Inventor: Charles L. Gray, Jr., Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,086

(22) Filed: Apr. 5, 2006

(65) Prior Publication Data

US 2006/0191513 A1    Aug. 31, 2006

Related U.S. Application Data

(63) Continuation of application No. 10/733,696, filed on Dec. 11, 2003, now Pat. No. 7,025,042.

(51) Int. Cl.
*F02M 7/00* (2006.01)
*F02B 5/00* (2006.01)

(52) U.S. Cl. ..................... 123/435; 123/305

(58) Field of Classification Search ............... 123/435, 123/436, 681, 687, 692, 704, 676, 678, 677, 123/295, 305

See application file for complete search history.

(56) References Cited

U.S. PATENT DOCUMENTS

| | | | | |
|---|---|---|---|---|
| 6,286,482 | B1 * | 9/2001 | Flynn et al. | 123/435 |
| 6,516,774 | B2 * | 2/2003 | zur Loye et al. | 123/299 |
| 6,640,773 | B2 * | 11/2003 | Ancimer et al. | 123/299 |
| 6,651,432 | B1 * | 11/2003 | Gray, Jr. | 60/605.2 |
| 6,684,849 | B2 * | 2/2004 | zur Loye et al. | 123/295 |
| 6,742,494 | B2 * | 6/2004 | Unger et al. | 123/305 |
| 6,848,421 | B1 * | 2/2005 | Karau et al. | 123/406.22 |
| 7,000,596 | B2 * | 2/2006 | Zurloye et al. | 123/435 |
| 7,025,042 | B2 * | 4/2006 | Gray, Jr. | 123/435 |
| 2001/0050068 | A1 * | 12/2001 | Kruse | 123/295 |
| 2003/0168037 | A1 * | 9/2003 | zur Loye et al. | 123/295 |
| 2004/0079323 | A1 * | 4/2004 | Fuerhapter | 123/295 |

* cited by examiner

*Primary Examiner*—Mahmoud Gimie
(74) *Attorney, Agent, or Firm*—David H. Read

(57) ABSTRACT

A multicylinder homogeneous charge compression ignition (HCCI) engine with a control system designed to maintain stable HCCI combustion during engine speed/load transitions by: (1) determining "combustion parameter" values such as the maximum rate of pressure rise for each cycle of each cylinder, (2) adjusting engine operating parameters (such as charge-air intake temperature, intake pressure (boost), or charge-air oxygen concentration) to effect a change in the combustion parameter value, (3) thereafter adjusting an engine "control parameter" (e.g., commanded fuel quantity) to each cylinder to maintain a desired target for the combustion parameter value (such as 10 bar/crank angle degree, or a smaller value, such as 6 bar/crank angle degree), and (4) individually adjusting cooling, heating and/or fuel command to deviating cylinders to achieve uniform combustion.

19 Claims, 8 Drawing Sheets

METHODS OF OPERATION FOR CONTROLLED TEMPERATURE COMBUSTION ENGINES USING GASOLINE-LIKE FUEL, PARTICULARLY MULTICYLINDER HOMOGENOUS CHARGE COMPRESSION IGNITION (HCCI) ENGINES

CROSS REFERENCE TO RELATED APPLICATIONS

This application is a continuation of U.S. application Ser. No. 10/733,696, filed Dec. 11, 2003 now U.S. Pat. No. 7,025,042 B2, which is hereby incorporated by reference.

BACKGROUND OF THE INVENTION AND DESCRIPTION OF RELATED ART

The present invention relates to methods for controlling combustion in a multicylinder controlled temperature combustion engine using gasoline-like fuel, particularly in a homogeneous charge, compression ignition (HCCI) type engine, also known as a premixed charge compression ignition (PCCI) engine.

Various prior art publications recognize that several parameters influence the initiation of combustion in an HCCI engine. See, for example, U.S. Pat. No. 6,286,482 to Flynn, et al., and Aceves, HCCI Combustion: Analysis and Experiments, SAE 2001-01-2077. Such recognized parameters include: fuel type, compression ratio, intake charge temperature, oxygen concentration in the charge air, equivalence ratio, charge air density, and boost pressure. However, absent from the prior art is a practical method for controlling the initiation of combustion in an HCCI engine to the optimum timing (e.g., as determined by crank angle location) over the full range of an engine's speed and load operation. Also absent from the prior art is a practical method for successfully transitioning from one speed/load operating point to another speed/load operating point quickly (i.e., controlling transient engine operation). Also, absent from the prior art is a practical method for adjusting (or balancing) the combustion from cylinder to cylinder in a multicylinder engine during engine transients (which requires very fast adjustment, e.g., within a single engine cycle or less than 1/30 of a second at high engine speed). The present invention provides a new method of operation for an engine with HCCI combustion that eliminates these and other deficiencies of the prior art.

SUMMARY OF THE INVENTION

The present invention provides an HCCI engine with a control system to maintain stable, efficient, low emission HCCI combustion during engine transitions from one speed/load point to another speed/load point. The present invention also provides for individual cylinder combustion control in the preferred multicylinder engine embodiment.

As identified in the Controlled Temperature Combustion Engine parent application hereto, key parameters (usually referred to as "engine operating parameters" herein) that influence the crank angle location of the combustion event for various engine speed and load operating points include charge-air intake temperature (T1), intake pressure (boost), charge-air oxygen concentration, engine cooling, and engine compression ratio. In the present invention, these "engine operating parameters" are adjusted in coordination with adjustments in fuel quantity to transition the HCCI engine between speed and load conditions as will be described herein. For the purposes of the present application, "engine operating parameter" is to be distinguished from an engine "combustion parameter" (i.e. characteristics of the timing, duration, or rate of combustion) or engine "control parameter" (i.e. a dominant or primary determinant in controlling engine operation). Sample various parameters, as defined for the purposes of the present invention, are summarized in Table 1 below.

Under the preferred embodiment of the present invention, the HCCI engine operates by:

(1) determining the beginning of rapid combustion by determining an existing "combustion parameter" value, such as the maximum rate of pressure rise (MRPR), for each cycle of each cylinder, and adjusting an engine "control parameter" (e.g., commanded fuel quantity) to each cylinder to maintain a target combustion parameter value (e.g., MRPR) for each speed/load engine operating point.[1]

[1] For this application, to adjust a "parameter" or "parameter value" mean the same thing.

(2) comparing the commanded fuel quantity (i.e. the engine control parameter) of each individual cylinder to the other cylinders and adjusting an engine operating parameter (e.g., the cooling/heating) of individual "outlier" (deviating) cylinders, or using other means, to achieve acceptably uniform combustion and commanded fuel quantity cylinder to cylinder. Individual cylinder temperature trim may be achieved by adjusting coolant flow among cylinders (to individual cylinders). A preferred trim is achieved by adjusting intake charge-air temperature (an engine operating parameter) by individual cylinder hot EGR flow rate control.

(3) achieving speed/load commanded changes by first adjusting at least one of the operating parameters of the engine (e.g., intake temperature, intake pressure, intake oxygen concentration, or perhaps compression ratio) instead of "first" increasing or decreasing fuel quantity as in prior art. Fuel quantity then "follows" or responds to the effect of the adjusted engine operating condition, to maintain a target combustion parameter value (e.g., MRPR). Thus, unlike prior art HCCI methods, the present invention controls and adjusts fuel quantity in response to a changed combustion event characteristic which resulted from the engine operating parameter change. In comparison, prior art HCCI methods change engine speed or fuel quantity (i.e., load) and then adjust/control engine operating conditions.

In summary, the HCCI engine of the present invention controls load (and reacts to speed changes) by adjusting certain engine operating parameters (e.g., intake temperature, intake oxygen concentration, intake boost, engine cooling, etc.). Fuel adjustments follow the changed operating condition of the engine to provide desired engine load at a given speed, and fuel is adjusted by the controller on a cylinder-by-cylinder basis to achieve and maintain a target engine combustion parameter (e.g., location of peak cylinder pressure, maximum rate of cylinder pressure rise, etc.) obtained from a stored engine map to achieve the optimum location (and character) of the combustion event. Each individual cylinder is maintained under closed-loop fuel control to achieve and maintain the target engine combustion parameter in the preferred embodiment. Fuel control is thus the primary engine combustion control parameter in the preferred embodiment.

TABLE 1

"Parameters" Used in the Description of the Present Invention

Engine Operating Parameters - Parameters that influence the characteristics of the combustion event (e.g., crank angle location) and which are first changed in the present method to cause a change in engine load (and to react to speed changes). Engine Operating Parameters include:

intake charge-air temperature
intake charge-air oxygen concentration
intake charge-air pressure (boost level)
engine cooling
engine compression ratio TABLE 1-continued "Parameters" Used in the Description of the Present Invention Engine Combustion Parameters - Parameters which characterize
the timing, rate or duration of the combustion event.
Engine Combustion Parameters include:

maximum rate of combustion pressure rise (MRPR)
crank angle location of the combustion event
location of peak combustion pressure
beginning of rapid combustion Engine Control Parameters - The parameter or parameters which
are controlled to maintain a target combustion parameter value
while one or more engine operating parameters are changed,
which includes as a preferred parameter:

fuel rate

DETAILED DESCRIPTION OF THE INVENTION

Figure 1:
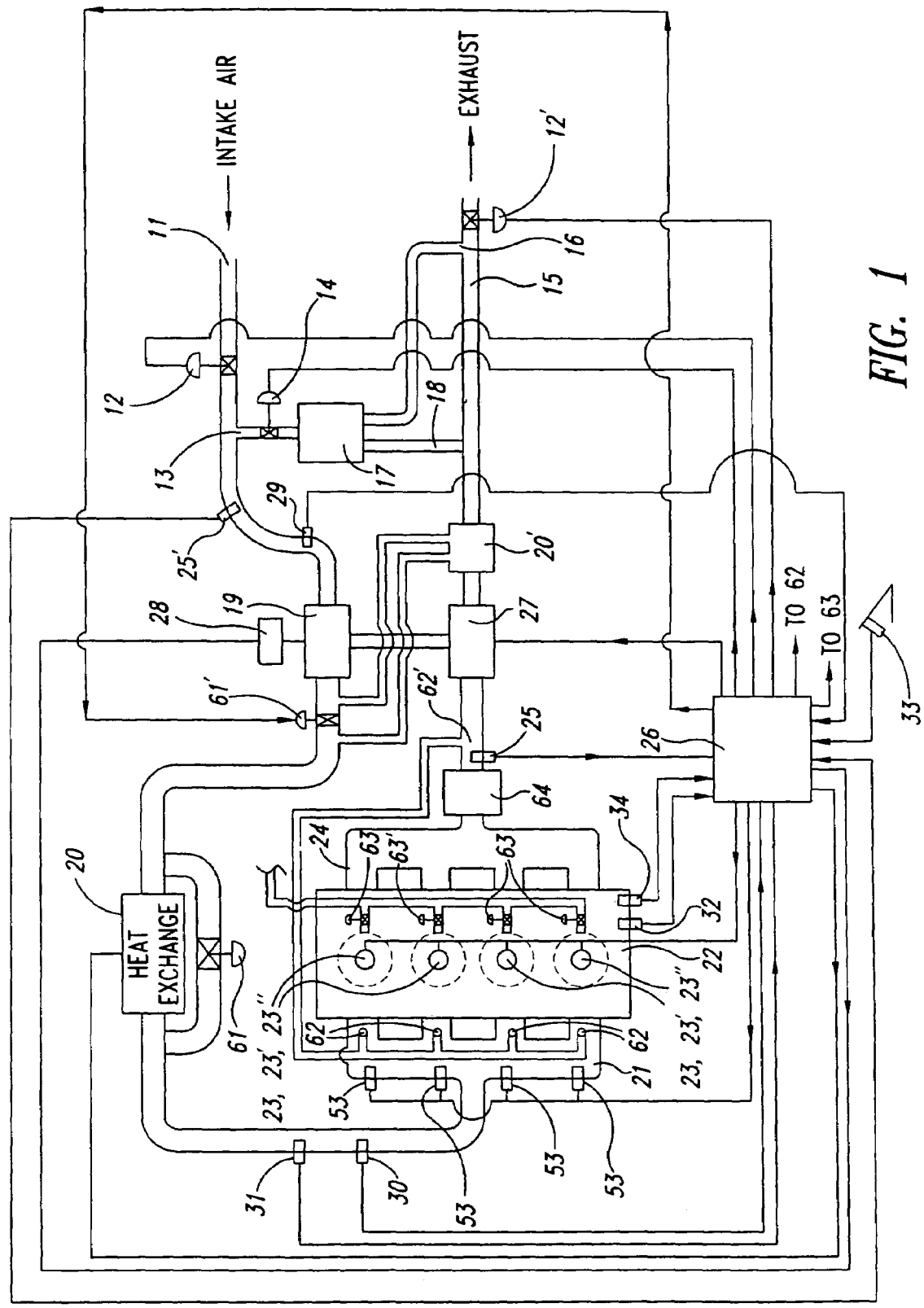
FIG. 1 is a schematic diagram of a preferred embodiment of the HCCI internal combustion engine system of the present invention.

FIG. 1, shows a preferred embodiment for an HCCI combustion system for multicylinder engine 22 in accordance with the present invention. Intake air enters the intake system at port 11 and flows through optional valve 12. Exhaust gas may be mixed with the intake air (forming the charge-air[2] mixture) at port 13, with EGR control valve 12' in the exhaust line 15 creating an exhaust back pressure to force exhaust gas to flow through port 16, through optional cooler 17 (with optional condensate return line 18) and through optional on-off control valve 14 to port 13. (An alternate "high pressure" EGR system may instead be used which would connect the exhaust line before turbine/motor 27 with the intake line after compressor 19.) The charge-air then flows through optional compressor 19, which may be driven by turbine/motor 27 and/or optional motor 28. The compressor 19 and motors 27 and 28 may be single units or multiple units in series or parallel, as will be known in the art.

[2]The term "charge-air" will nevertheless be used broadly herein to encompass all air taken into the cylinder for combustion, regardless of whether exhaust gas is recirculated for combustion.

Continuing with FIG. 1, a portion or all of the charge-air may flow through exhaust-to-charge-air heat exchanger 20' to heat the charge-air, and a portion or all of the charge-air may bypass heat exchanger 20', such flow being controlled by bypass valve 61'. Heat exchanger 20' may be located anywhere within the exhaust system but preferably after turbine/motor 27, or within the engine "coolant" system. A portion or all of the charge-air may then preferably flow through heat exchanger 20 (to cool the charge-air), or through a bypass path, as controlled by bypass valve 61. The charge-air then enters the intake manifold 21 and engine 22. Individual port fuel injectors 53 are located in the individual cylinder intake runners of intake manifold 21 to allow individual cylinder fuel control. Alternatively, or in addition, direct cylinder fuel injectors 23 may be used to supply fuel to each cylinder. Individual port hot EGR valves 62 may be used to control the flow of hot exhaust gas from the exhaust at port 62' to the intake runners of each cylinder to allow individual cylinder hot EGR flow. The charge-air and fuel enter the engine combustion chamber (not shown) through conventional intake valves (not shown). Combustion occurs and the exhaust gases exit the combustion chamber through conventional exhaust valves (not shown) into exhaust manifold 24.

In engine 22, each cylinder may contain a spark plug 23" (or other ignition means, as well known in the art) for use in cold starting the engine. Each cylinder also contains a combustion sensor 23', which is a pressure sensor in the preferred embodiment. Each cylinder's combustion chamber may be individually and locally cooled by engine coolant coming from the base engine's coolant heat exchanger (radiator) 81 (not shown) and controlled individually by valves 63. Exhaust gas flows through catalyst 64 for exhaust clean-up. Catalyst 64 may be located before or after turbine 27, but preferably before heat exchanger 20'. The exhaust gas then flows through turbine/motor 27, through heat exchanger 20', though exhaust 15 to ambient.

To manage the system for HCCI combustion, controller 26 receives a variety of inputs from various sensors, which may include crank angle position sensor 34, boost charge-air pressure sensor 31, charge-air temperature sensor 30, oxygen sensor 25', oxygen sensor 25, charge-air mass flow sensor 29, engine speed sensor 32 and torque command level pedal sensor 33. Controller 26 then sends a variety of corresponding control commands to various valves, actuators and devices as known in the art, such commands determined from stored maps, the result of calculations, or other determining means to control the operation of engine 22 by the method of the present invention, as will be described in more detail hereafter.

It should be noted that in the system set forth above, it is preferable to minimize the intake system volume from port 13 to the combustion cylinders to decrease the response time of a commanded change in intake oxygen concentration (i.e., to minimize transport lag). In addition, the individual cylinder hot EGR system (including valves 62) may be used to trim individual cylinder intake charge-air temperature to balance combustion among cylinders and/or to provide a potentially lower cost alternative to intake charge-air heater 20'. Since the maximum charge-air heating is needed for the minimum load operating points (see FIG. 3), and the minimum load operating points also produce the highest exhaust oxygen levels, using hot exhaust gas directly mixed with charge-air to increase charge-air temperature is an attractive option for increasing the intake charge-air temperature, particularly at minimum load operating points.

Figure 2:
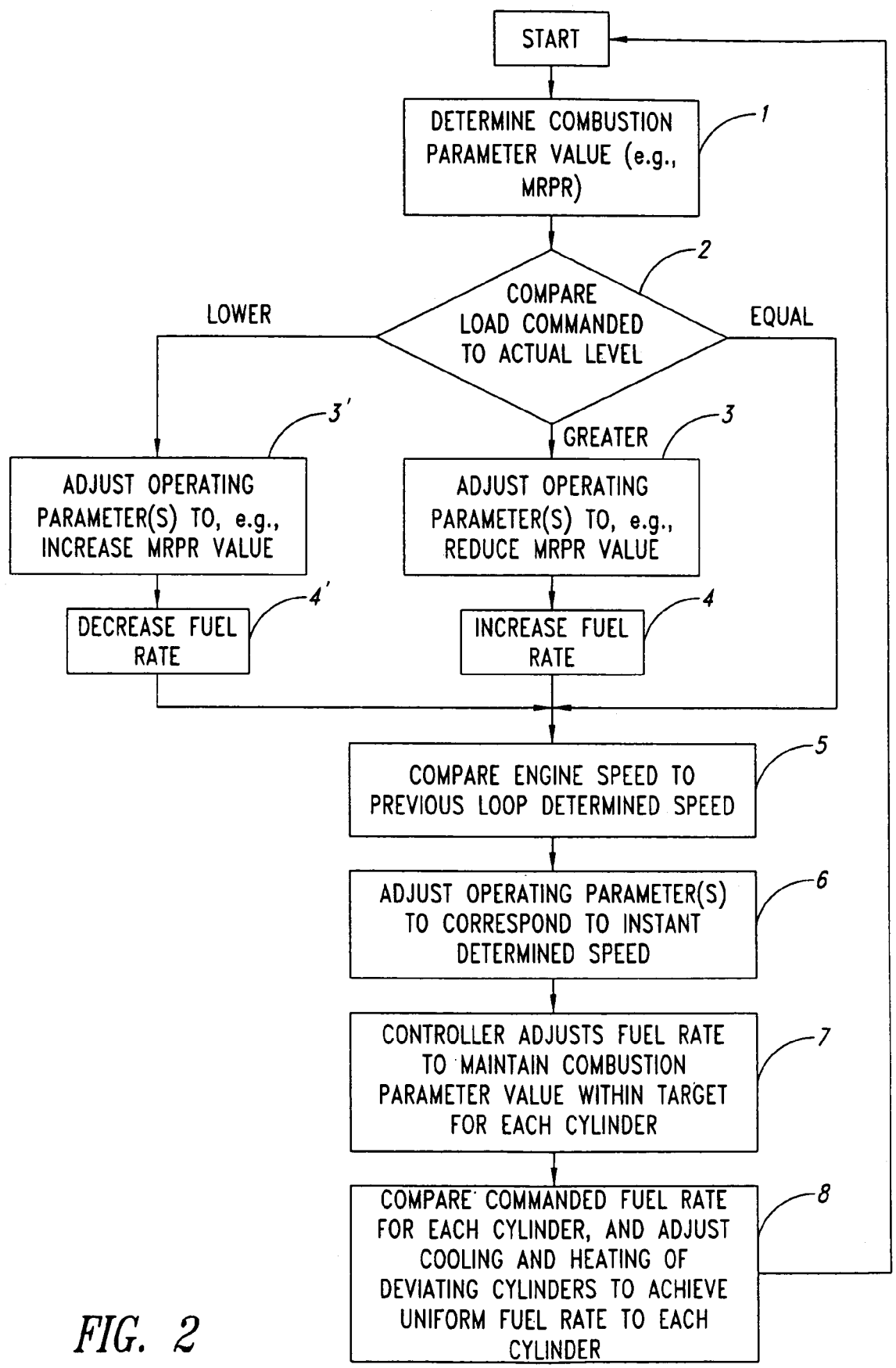
FIG. 2 is a flow chart for preferred steps of the method of the present invention.

In order to maintain operation of the engine system above in stable HCCI combustion in connection with changes in power level demand, control of the system preferably proceeds first, as set forth in FIG. 2 (step 1), by determining an existing "combustion parameter" value, such as the maximum rate of pressure rise (MRPR), for each cycle of each cylinder. Sensing of MRPR is just one preferred method of measuring the rate of increase in pressure within the combustion chamber during the period of rapid combustion, with MRPR usually expressed in units of Bar per crank angle degree. For each cylinder, the MRPR value represents the degree or rate of rapid combustion in that cylinder, and may be determined by means of pressure sensor 23', as will be known in the art. For the present invention, MRPR has been selected as the preferred engine combustion parameter characterizing the rate of rapid combustion. While any engine combustion parameter which relates to the nature of the combustion event potentially may be used to determine changes in the combustion event cycle-by-cycle, MRPR will usually be used herein in describing the present invention.

Once the existing combustion parameter value (e.g, MRPR) has been determined for each engine cylinder, in the event of a need for change in the engine speed/load operating point to meet the current power demand (FIG. 2, step 2), controller 26 then issues corresponding command signals to adjust at least one engine operating-parameter (e.g., intake temperature, intake pressure, intake oxygen concentration, or perhaps compression ratio) as may be necessary to cause the combustion parameter value to deviate from the predetermined desired range (FIG. 2, steps 3 and 3'). This may be done for all cylinders or for just deviating ("outlier") cylinders, as will be discussed below.

Engine operating parameters may be adjusted in various ways to affect the particular combustion parameter value (e.g. MRPR) being controlled for HCCI combustion. For example, increasing boost (intake pressure) alone at a fixed oxygen concentration increases oxygen density of the charge-air, which advances the location of the combustion event, including the location of peak combustion pressure and beginning and rate of rapid combustion. Thus, MRPR increases with an increase in intake-charge-air pressure.[3] On the other hand, increasing the rate of exhaust gas recirculation (EGR) decreases charge-air oxygen density (for a given pressure) and intake oxygen concentration, which retards the location of the combustion event and reduces MRPR. Additionally, increasing the intake charge-air temperature advances the location of the combustion and increases the MRPR at a given load/fuel-rate level. Likewise, increased cooling of the combustion chamber walls similarly retards the location of the combustion event and lowers the MRPR. Increased engine compression ratio increases post-compression temperatures, and thus advances the location of the combustion event and increases MRPR. Adjustments in the opposite direction of the above operating parameters likewise produce the opposite effect on MRPR.

[3]Note, however, that increasing boost also has the secondary effect of increased cooling of the combustion chamber walls (because of an increase in overall heat capacity of the charge-air), which retards the location of combustion and partially offsets the increase in MPPR.

The particular engine operating parameter to be changed to maintain HCCI combustion for a given change of conditions may depend on the particular engine response desired. For example, to increase engine load, a combination of increased boost and reduced intake charge-air oxygen concentration (increased EGR) is the preferred operating means. On the other hand, to operate HCCI combustion at low load, intake charge-air temperature is the preferred engine operating parameter. To correct MRPR (or other desired combustion parameter) for an individual cylinder, to bring it into acceptably uniform combustion with other engine cylinders, the preferred operating parameter adjustment is through individual cylinder temperature trim, either by adjusting coolant flow between the individual cylinders or by adjusting individual intake charge-air temperature through individual cylinder hot EGR flow rate control as discussed above.

Figure 3:
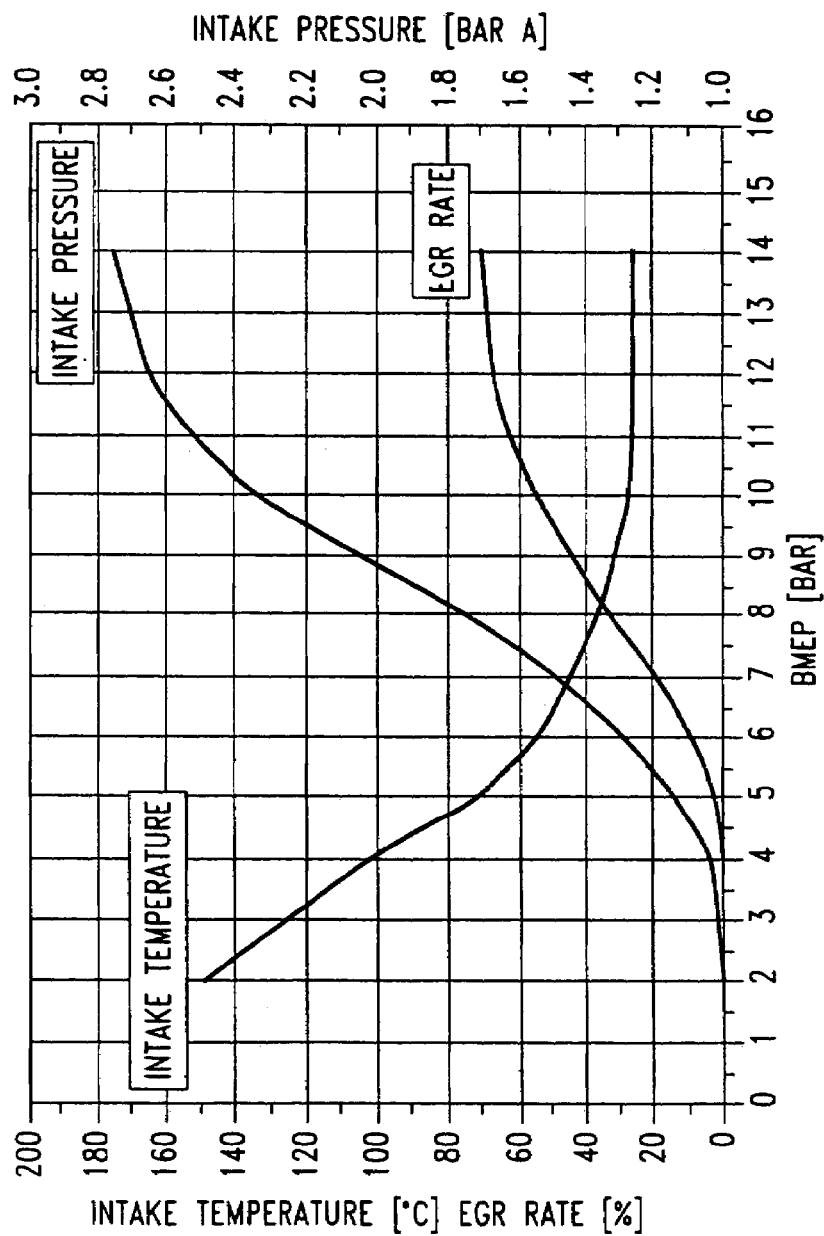
FIG. 3 is a graph presenting sample engine operating parameter values for stable HCCI combustion at given speed/load conditions in accordance with the invention.

The general relationships and relative values of some of the engine operating parameters above, for stable HCCI combustion at a sample engine speed and compression ratio, are presented at FIG. 3 as a function of engine load (BMEP), with other engine operating parameters such as engine cooling held relatively normal and constant. These values and relative sequencing would of course change with changes in other engine operating parameters, as should be understood in the art. For example, the intake (charge-air) temperature level presented is most characteristic of an engine compression ratio of 15. For lower compression ratios the temperature would directionally be higher for a given low to medium load (BMEP), and for higher compression ratios the temperature would be lower (e.g., the intake charge-air-temperature at 2 Bar BMEP for a compression ratio of 19 would be near 100° C.). The intake charge-air, oxygen concentration (the higher EGR rate creating a lower charge-air oxygen concentration) would also generally be lower at a given load for higher compression ratio. A change in engine speed would also make a difference (lower speed provides more time for reaction and allows lower intake temperature). Also, higher intake temperature would be needed in the event of greater engine cooling. The intake pressure (boost level) is determined as an amount sufficient to provide reasonable combustion control and to maintain $T_3$ (combustion temperature) less than the target NOx threshold. These fundamental relationships are further described in the Controlled Temperature Combustion parent application hereto.

Importantly, in conjunction with the engine operating parameter adjustments above stable HCCI combustion is maintained in the present invention during changes in speed and load conditions through careful adjustment of fuel quantity supplied to the cylinders. Fuel control is the primary engine combustion control parameter in the preferred embodiment. Indeed, the commanded fuel quantity to each cylinder is the dominant and primary factor in maintaining a target combustion parameter value (e.g., MRPR) for each speed/load engine operating point during engine operation, and may be quickly adjusted as needed to respond to changes in the above-listed engine operating parameters, to keep MRPR within desired ranges while the engine operating parameters are being adjusted. This coordination of changes allows the engine to move toward a different speed/load operating point, with changes in fuel rate matching (offsetting) the effect of changes in engine operating parameters, without destabilizing the HCCI combustion in the engine during the transition.

Thus, as an example, in the event of a demand to increase engine power output, the combustion system of the present invention may respond by changing an engine operating parameter(s) to retard the location of combustion and reduce MRPR (FIG. 2, step 3). This change is then preferably followed by the controller 26 commanding an increase in fuel rate (FIG. 2, step 4) to offset the actual change in MRPR and maintain a target location of combustion (or target value of MRPR), which increase in fuel in turn increases engine load in a controlled manner. Control loops within the engine controller are extremely fast and thus fuel adjustments closely follow the changes in engine operating parameters. Similarly, changing an engine operating parameter(s) to advance the location of combustion and increase MRPR (FIG. 2, step 3') results in controller 26 commanding an offsetting decrease in fuel rate (FIG. 2, step 4') to maintain a target location of combustion (or target value of MRPR), which reduces engine load.

In this manner, the method of the present invention utilizes an engine combustion control parameter such as fuel rate in the preferred embodiment (intake charge-air temperature or oxygen concentration in other embodiments) in closed-loop adjustment/control, to respond to and offset the effect of changing an engine operating parameter, to keep the engine combustion parameter (e.g., MRPR) at a target value for the instant engine operation point (speed/load) while adjusting the load to meet the commanded power output for the engine. Steps 5 to 8 of FIG. 2 show the completion of the closed loop under this method, to respond to speed changes in each loop, as will be understood in the art.

As can be seen from the foregoing, unlike prior art HCCI methods, the present invention controls fuel quantity in response to a stimulated, changed combustion event characteristic which resulted from the engine operating parameter change. In other words, it changes at least one of the operating conditions (parameters) of the engine to stimulate a control system response to adjust fuel quantity to achieve a new commanded engine load (or react to speed change) in comparison, prior art HCCI methods change fuel quantity (i.e., load), and then adjust/control engine operating conditions, in response to a change in power demand. The prior art does not have fuel quantity "follow" or respond to the effect of an adjustment in engine operating condition as a means to maintain a target combustion parameter value such as MRPR, to effect a change in engine load or react to a speed change.

Finally, in the preferred embodiment of the invention, controller 26 may additionally compare the commanded fuel quantity (i.e. the engine control parameter) of each individual cylinder to the other cylinders and adjust an engine operating parameter (e.g., the cooling or heating) of individual "outlier" (deviating) cylinders, or use other means, to achieve acceptably uniform combustion and commanded fuel quantity cylinder to cylinder (FIG. 2, step 8). In addition, fuel is preferably adjusted by the controller on a cylinder-by-cylinder basis to achieve and maintain a target engine combustion parameter (e.g., location of peak cylinder pressure, maximum rate of cylinder pressure rise, etc.) obtained from a stored engine map to achieve the optimum location (and character) of the combustion event for each cylinder. Each individual cylinder is therefore under closed-loop fuel control to achieve and maintain the target engine combustion parameter in the preferred embodiment.

Alternatively, in another embodiment, instead of individual cylinder fuel control, the controller may provide closed-loop fuel control for the engine overall (e.g., based on the average of all cylinders' combustion parameter values), and rely on separately adjusting non-fuel engine operating parameters for individual cylinders to achieve cylinder-to-cylinder combustion balance (i.e., to achieve a similar value for the combustion parameter for all cylinders). Cylinder-to-cylinder combustion balance may be maintained in this alternative preferred embodiment by controlling: (1) the rate of individual cylinder cooling, (2) the intake temperature to individual cylinders (especially by the preferred method of individual cylinder hot EGR control), (3) individual cylinder oxygen concentration, (4) individual cylinder compression ratio, (5) individual cylinder boost level, and/or (6) other means for adjusting the combustion parameter well known to those skilled in the art.

As should already be clear from the discussion above regarding its use to offset changes in MRPR above, it should nevertheless be noted that although fuel rate is the preferred control parameter of the present invention, it is also broadly an engine operating parameter and may be used as such, as it also affects the combustion parameters such as MRPR. For example, increasing the fuel quantity per combustion event increases the fuel density and concentration and results in greater heat release, which advances the location of the combustion event and increases MRPR. In addition, it should be obvious that increased fuel rate is ultimately necessary to increase engine load and respond to power demands on the engine.

Furthermore, in the preferred embodiments, it is generally desirable to operate at the lowest boost (for lowest cost) that achieves the target NOx level and best efficiency with acceptable variability/stability of combustion for each engine operating point (speed/load). In addition, for the highest loads, the engine is preferably operated with the coolest practical intake charge-air temperature, "enough" boost, and continued reduction in intake charge-air oxygen concentration. For highest load and speed, increased engine cooling is also desirable.

In order to implement the sequences and methods of engine operation set forth above, controller 26 is preferably programmed with a control strategy to maximize HCCI combustion stability. Specific control strategies may include control logic as will now be discussed below.

Figure 4:
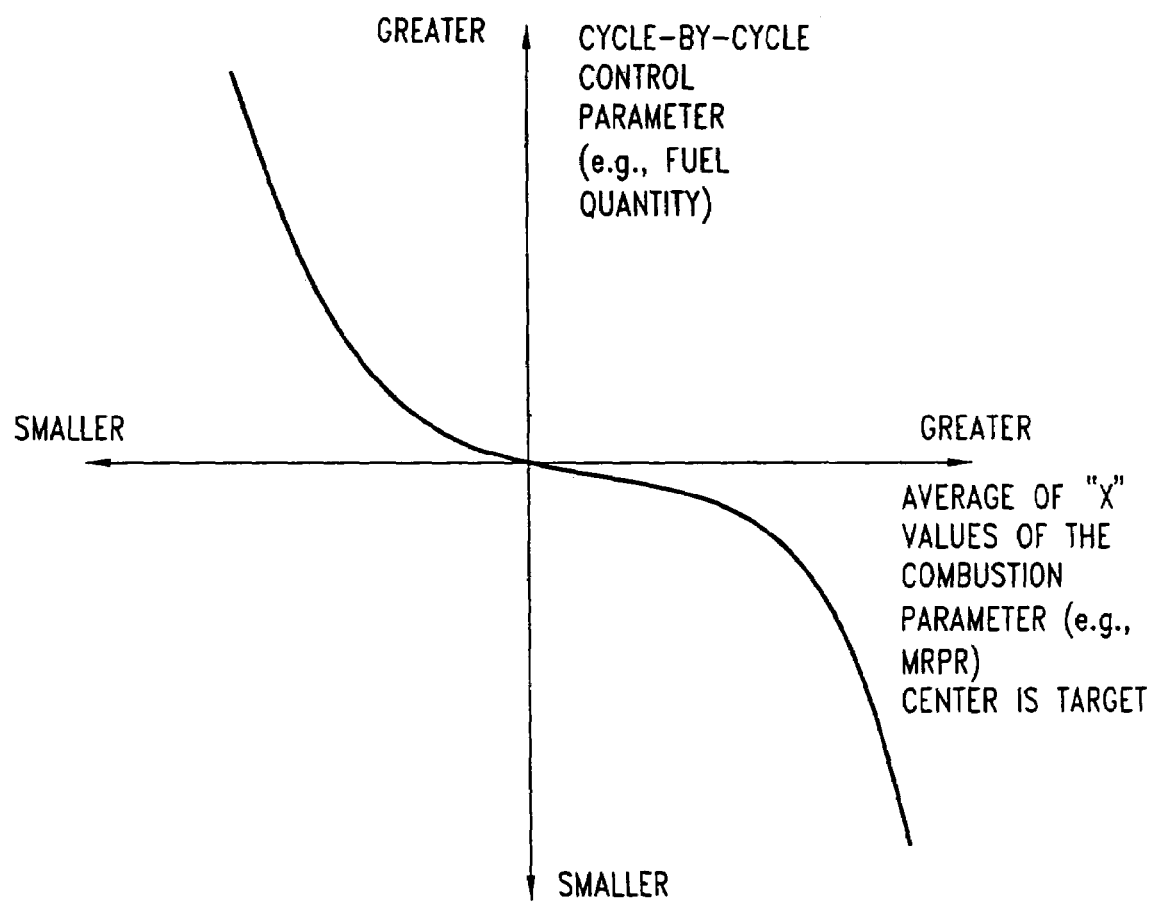
FIG. 4 presents the control response between the engine control parameter and combustion parameter used in conjunction with a preferred control strategy of the present invention.

As a first programmed control strategy, cycle-by-cycle combustion parameter values may be averaged for the last "X" cycles (running average), with the engine control parameter (e.g., fuel rate) adjusted cycle-by-cycle as appropriate (and preferably cylinder-by-cylinder) to keep the combustion event in a preferred location (e.g., between TDC and 20 crank angle degrees after TDC of the combustion/expansion stroke) and/or the combustion parameter (e.g., MRPR) within a target range for the operation condition. In this control strategy, "X" is preferably determined as a function of the speed and load of the engine, and of the rate of change of speed and/or load. For example, "X" may be 3 to 5 for relatively steady operation, and drop to 1 to 3 for engine transients. The number of cycles to be averaged depends on the stability (cycle-to-cycle variations) of the engine and operating point. FIG. 4 presents an illustration of the control response between the cycle-to-cycle control parameter (e.g., fuel quantity) and the combustion parameter (e.g. MRPR) as would be controlled under this control strategy, with the strategy designed to maintain the combustion parameter value at or near the center of the graph.

Figure 5:
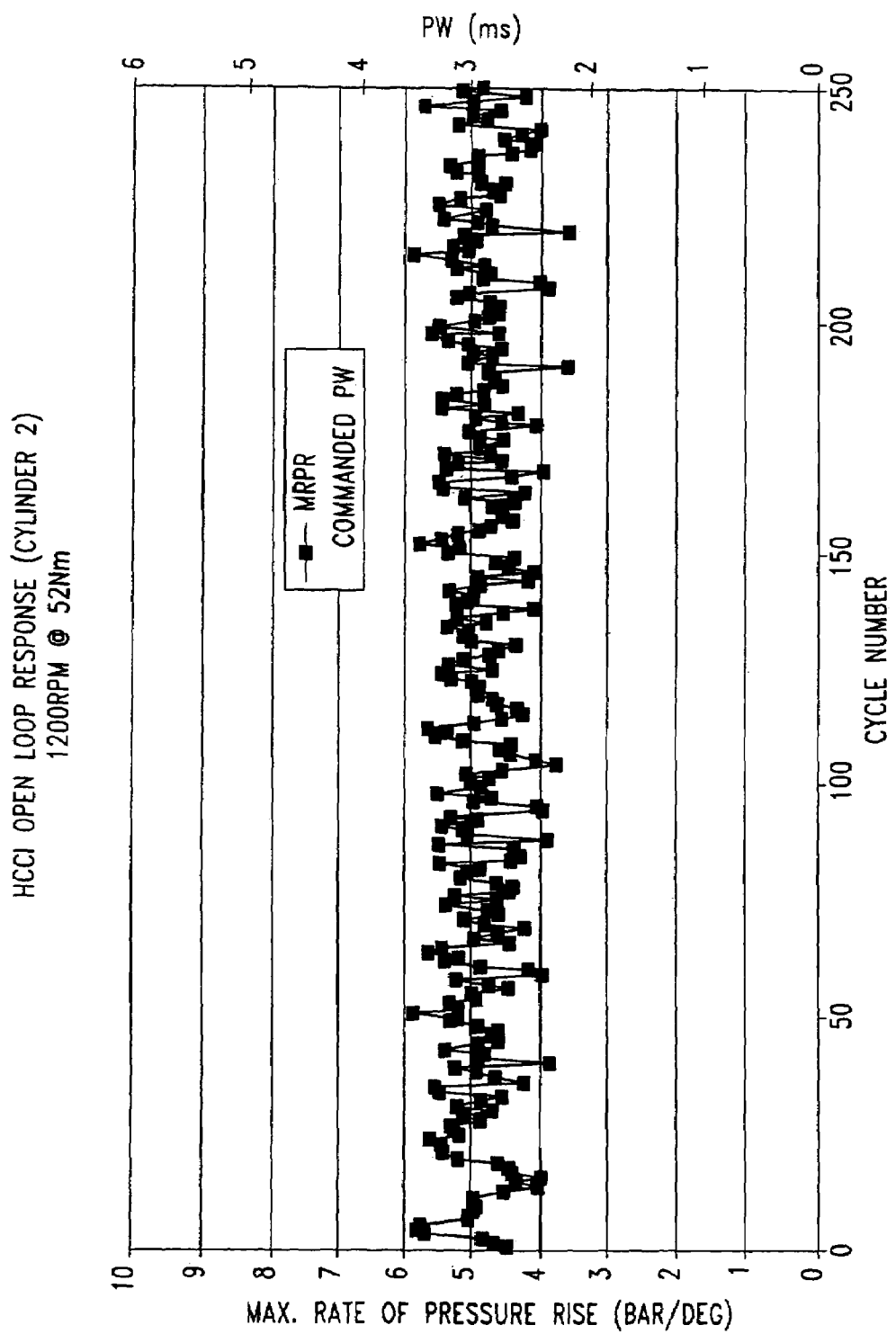
FIG. 5 is a graph presenting sample cycle-by-cycle combustion parameter variation with an HCCI engine operated in accordance with the invention.

Combustion parameter values are preferably averaged in the control strategies herein because of the typical cycle-to-cycle variation of the combustion parameter MRPR even for a "stable" HCCI operating point (i.e., where the engine operating parameters and the control parameter commanded fuel rate are constant). FIG. 5, for example, shows cycle-to-cycle variation of MRPR for a stable HCCI engine operating condition at 1200 RPM and 52 Newton-meters (Nm) of torque. The commanded fuel rate is expressed as a pulse width (PW) signal to the fuel injector. While it is of course desirable to reduce such variability, the remaining variability in stable HCCI combustion preferably should not stimulate the combustion control parameter to change unless an "actual" (i.e. semi-consistent) shift in the combustion occurs due to a changed engine operating parameter.

Figure 6:
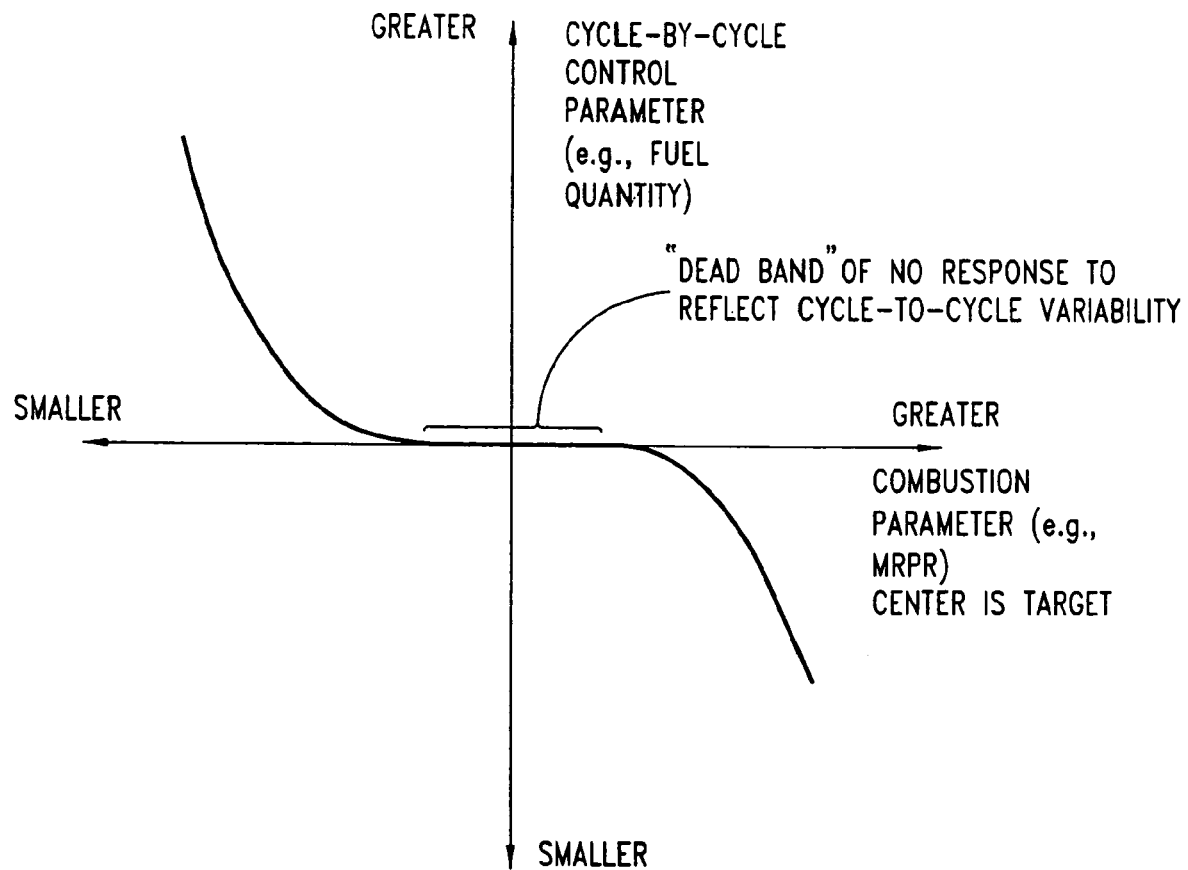
FIG. 6 presents the control response between the engine control parameter and combustion parameter, as considered and used in conjunction with an alternate preferred control strategy of the present invention.

In order to further account for this variability in combustion parameters even in stable HCCI combustion, a second programmed control strategy may be utilized in this alternative strategy, a relatively broad range of the cycle-to-cycle combustion parameter values may be specified for each engine speed/load operating point as a "dead band" to account for the random variability in the combustion parameter values caused by the engine hardware, where no response from the control parameter (e.g., fuel rate) would be triggered. FIG. 6 illustrates the control response between the cycle-to-cycle control parameter (e.g., fuel quantity) and the combustion parameter (e.g. MRPR) as would be controlled under this alternative control strategy, with the strategy again designed to maintain the combustion parameter value at or near the center (dead band) target of the graph. In this manner, response functions would only be triggered once the combustion parameter value deviated outside the "dead band" region, which helps to ensure that the control parameter response occurs (appropriately) only to actual changes in engine operating parameters which have caused a material change in the combustion character.

Under either control strategy above, during rapid transients (e.g., a command for a rapid rise in load), additional control logic may be utilized to (a) reduce the number of cycles averaged for combustion parameter values (i.e., to be more responsive to the rapid changes required), (b) widen the window of "no-response" (i.e. dead band) combustion parameter values to reflect greater system variability during such modes of operation, and (c) adjust the combustion parameter "target" to a value that may be more stable (but less optimum for efficiency or emissions) during the short period of the rapid change (e.g., changing from an MRPR of 10 bar/crank angle degree to 6 bar/crank angle degree).

Figure 7A:
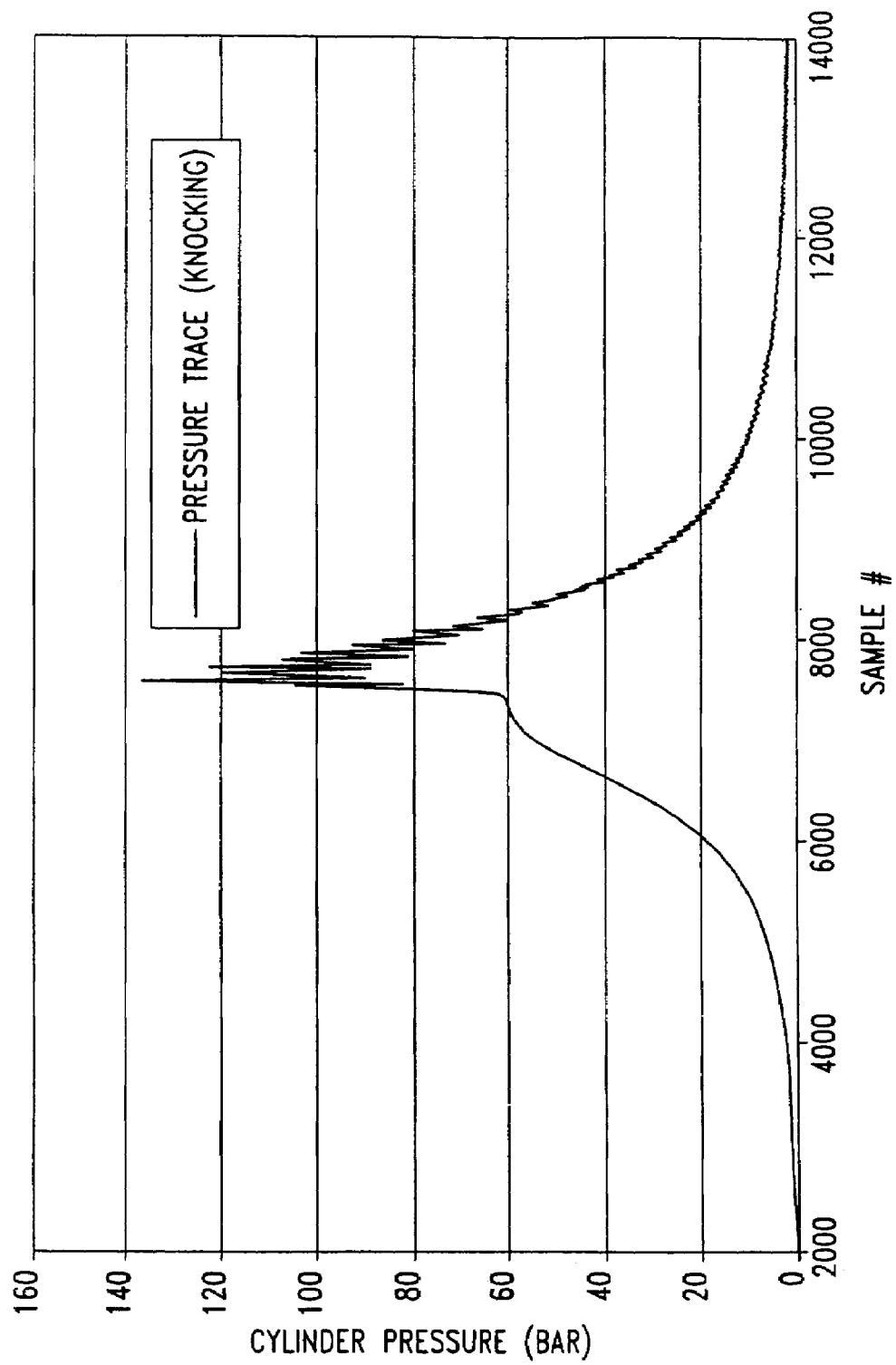
FIG. 7a presents a pressure trace reflective of knocking in an HCCI engine.
Figure 7B:
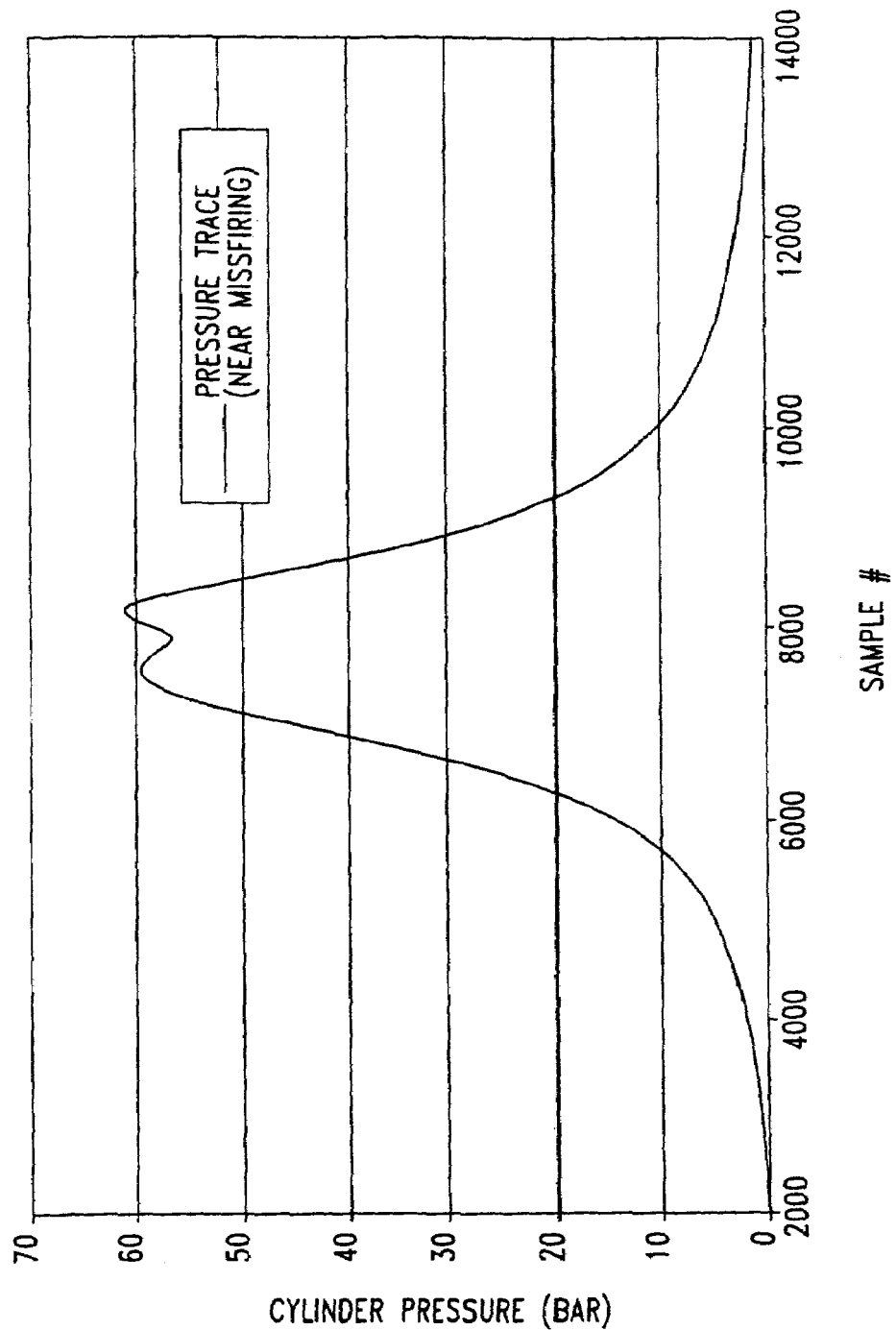
FIG. 7b presents a pressure trace reflective of a near-misfire in an HCCI engine.

In any case, the control method for the combustion events must be capable of always controlling the location of combustion to occur between a knocking combustion (see cylinder-pressure trace of FIG. 7a) and a "near misfire" combustion (see cylinder pressure trace of FIG. 7b), as provided by the present invention. In FIGS. 7a and 7b, the x axis corresponds to time or crank angle degrees, with a value of about 7500 representing TDC of the compression stroke.

Finally, as was previously mentioned, it is also desirable to reduce the cycle-by-cycle combustion variability, as determined by variation in the engine combustion parameter (e.g., MRPR). Such combustion variability generally increases with engine load and speed. To reduce such variability (and improve combustion stability), it is important to minimize uncommanded and unintended variations or changes in the engine operating parameters or engine control parameter. In addition, applicant has also found that two methods to minimize such variability include increasing boost and controlling combustion chamber cooling, as will be explained below.

Increased boost, even beyond that needed to achieve low $NO_x$ targets (as per the parent application hereto), increases charge-air mass for a given load (and speed), and this increased charge-air mass is an increased heat moderator (aka "heat sink"). Thus, if the charge-air mass is increased, the effect of a cycle-to-cycle variability in heat removed from the combustion chamber walls to the charge-air (which directly changes the temperature of the charge-air and thus the initiation of combustion and the character of the combustion event) is thus dampened. As a result, the applicant has found that if the charge-air mass is, for example, increased by 50%, the effect of cycle-to-cycle charge-air temperature changes due to engine variability effects is reduced on the order of 50% as well.

Controlling combustion chamber cooling may also be used to reduce the cycle-to-cycle effects of engine combustion variability. Combustion chamber cooling dampens the changes in heat flow that occur through the combustion chamber walls into the charge-air, which heat flow changes otherwise cause increased variation in the charge-air temperature, and thus induce variability in the combustion event as previously described. Controlled combustion chamber-cooling may be achieved in a variety of ways well known by those skilled in the art, but a preferred method of the present invention includes: (1) locating the combustion "bowl" (i.e. the volume containing the charge-air at and near TDC) in a location where cooling is most easily controlled, e.g., a volume not exposed directly to the exhaust valve(s), as in the piston under the intake valve(s), (2) having a variable (controlled) flow rate coolant-directing-port direct incoming (cooled) coolant to the area of the engine cylinder head above and/or surrounding the combustion bowl, and/or (3) using a variable and controllable means of cooling the piston (especially the volume surrounding the combustion), such as with a plurality of oil jets (or a multiple-flow jet) directed to the bottom of the piston in the area around the combustion bowl.

As stated above, the present invention includes a practical HCCI engine with a unique control system capable of maintaining stable, efficient HCCI combustion and low emissions at all speed and load points of engine operation and during engine transitions from one speed/load point to another speed/load point. The present invention also importantly provides for individual cylinder combustion control in multicylinder engines in the preferred embodiment.

It will be understood that the particular embodiments of the invention presented herein do not constitute all of the potential embodiments of the invention, and thus the scope of the invention is limited only by the claims hereafter, and not by the individual embodiments particularly detailed above.

I claim:

1. An internal combustion engine operable in homogeneous charge compression ignition mode, comprising:
   an engine body with a plurality of combustion cylinders formed therein;
   a combustion chamber formed in each combustion cylinder for combustion of a fuel and charge-air mixture;
   combustion parameter determining means for determining values of one or more combustion parameters of combustion in said combustion chamber, said combustion parameters characterizing the combustion event and reflecting at least changes in rates of said combustion from cycle to cycle;
   engine operation control means for adjusting one or more engine operating parameters to change one or more combustion parameter values for subsequent combustion events; and
   combustion control parameter control means, programmed to adjust combustion control parameter values responsive to said changes in said combustion parameter values, or in response to said engine operating parameter adjustments, and to limit or counteract changes in said combustion parameter values while one or more engine operating parameters are being adjusted by the engine operation control means.

2. The internal combustion engine of claim 1, wherein the combustion control parameter is fuel quantity.

3. The internal combustion engine of claim 1, wherein one of said combustion parameters characterizes a rate of increase in pressure within the combustion chamber during combustion.

4. The internal combustion engine of claim 1, wherein one of said combustion parameters is the maximum rate of pressure rise.

5. The internal combustion engine of claim 4, wherein the combustion parameter value is maintained around 10 bar/crank angle degree.

6. The internal combustion engine of claim 4, wherein the combustion parameter value is maintained around 5 bar/crank angle degree.

7. The internal combustion engine of claim 4, wherein the combustion parameter value is maintained around a target value that is less than 10 bar/crank angle degree.

8. A method of operating a multicylinder homogenous charge compression ignition (HCCI) internal combustion engine, comprising:
   taking into each of a plurality of combustion chambers in an internal combustion engine a quantity of fuel and a quantity of charge-air;
   determining the temperature of the charge-air;
   determining the pressure of the charge-air;
   determining the oxygen concentration of the charge-air;
   combusting a mixture of said fuel and said charge-air;
   determining one or more combustion parameters of the combustion of said mixture of fuel and charge-air, said combustion parameters characterizing the combustion event and reflecting at least changes in rates of said combustion from cycle to cycle;
   adjusting one or more of the temperature, the pressure, or the oxygen concentration of charge-air to be taken into said combustion chambers for subsequent combustion events; and
   controlling the quantity of fuel used in said combustion events, to responsively offset or limit changes in the combustion parameter that would otherwise occur from said adjustments to the temperature, the pressure, or the oxygen concentration of the charge-air.

9. The method of claim 8, wherein one of said combustion parameters characterizes a rate of increase in pressure within the combustion chamber during combustion.

10. The method of claim 8, wherein one of said combustion parameters is the maximum rate of pressure rise.

11. The method of claim 8, wherein the quantity of fuel is selected to achieve a targeted range for the combustion parameter.

12. The method of claim 11, wherein the targeted range for the combustion parameter is a maximum rate of pressure rise of 10 bar/crank angle degree.

13. The method of claim 11, wherein the targeted range for the combustion parameter is a maximum rate of pressure rise range targeting a value that is less than 10 bar/crank angle degree.

14. The method of claim 8, additionally comprising controlling the quantity of fuel used in combustion responsive to an averaged value for said determined combustion parameters, to reduce effects of engine combustion variability.

15. The method of claim 14, wherein the quantity of fuel is not changed in response to a change in the averaged value for said determined combustion parameter(s) if the averaged value falls within a specified dead band range.

16. A method of operating a multicylinder internal combustion engine in HCCI mode, comprising;
   determining a maximum rate of pressure rise in combustion from cycle to cycle; and
   controlling fuel quantity to keep the determined maximum rate of pressure rise at or near a center target value from cycle to cycle during transients, in order to maintain HCCI combustion stability through such transients.

17. The method of claim 16, wherein the maximum rate of pressure rise target value is about 10 bar/crank angle degree.

18. The method of claim 16, wherein the maximum rate of pressure rise target value is about 5 bar/crank angle degree.

19. The method of claim 16, wherein the maximum rate of pressure rise target value is about 6 bar/crank angle degree.

* * * * *

UNITED STATES PATENT AND TRADEMARK OFFICE
Certificate

Patent No. 7,237,532 B2                                                                                  Patented: July 3, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Charles L. Gray, Jr., Pinckney, MI (US); Ruonan Sun, Ann Arbor, MI (US); and Richard P. Thomas, Pinckney, MI (US).

Signed and Sealed this Twelfth Day of February 2013.

STEPHEN K. CRONIN
*Supervisory Patent Examiner*
Art Unit 3747
Technology Center 3700